(12) United States Patent
Deller et al.

(10) Patent No.: US 10,843,077 B2
(45) Date of Patent: Nov. 24, 2020

(54) SYSTEM AND METHOD FOR CREATION, PRESENTATION AND INTERACTION WITHIN MULTIPLE REALITY AND VIRTUAL REALITY ENVIRONMENTS

(71) Applicants: Brian Deller, Mountlake Terrace, WA (US); Michael Scott McCraw, Sammamish, WA (US)

(72) Inventors: Brian Deller, Mountlake Terrace, WA (US); Michael Scott McCraw, Sammamish, WA (US)

(*) Notice: Subject to any disclaimer, the term of this patent is extended or adjusted under 35 U.S.C. 154(b) by 0 days.

(21) Appl. No.: 16/436,637

(22) Filed: Jun. 10, 2019

(65) Prior Publication Data
US 2019/0374857 A1 Dec. 12, 2019

Related U.S. Application Data

(60) Provisional application No. 62/682,199, filed on Jun. 8, 2018.

(51) Int. Cl.
| | |
|---|---|
| *A63F 13/00* | (2014.01) |
| *A63F 13/56* | (2014.01) |
| *G06T 13/40* | (2011.01) |
| *H04L 29/06* | (2006.01) |

(52) U.S. Cl.
CPC ............ *A63F 13/56* (2014.09); *G06T 13/40* (2013.01); *H04L 67/38* (2013.01); *A63F 2300/8082* (2013.01)

(58) Field of Classification Search
None
See application file for complete search history.

(56) References Cited

U.S. PATENT DOCUMENTS

| | | | | |
|---|---|---|---|---|
| 9,865,089 | B2* | 1/2018 | Burns | G06F 3/012 |
| 2011/0216002 | A1* | 9/2011 | Weising | A63F 3/02 345/158 |
| 2013/0117377 | A1* | 5/2013 | Miller | A63F 13/12 709/205 |
| 2016/0217616 | A1* | 7/2016 | Kraver | A63F 13/5375 |
| 2016/0350973 | A1* | 12/2016 | Shapira | G06F 3/011 |
| 2018/0034867 | A1* | 2/2018 | Zahn | G06F 3/04842 |
| 2018/0342106 | A1* | 11/2018 | Rosado | A63F 13/86 |
| 2018/0356880 | A1* | 12/2018 | Kashihara | A63F 13/213 |
| 2018/0356885 | A1* | 12/2018 | Ross | G06F 3/04842 |
| 2018/0374264 | A1* | 12/2018 | Gatson | G01S 15/87 |

* cited by examiner

*Primary Examiner* — Paul A D'Agostino
(74) *Attorney, Agent, or Firm* — Fantastic IP Consulting

(57) ABSTRACT

A system and method for creating, presenting and permitting concurrent interaction by players within multiple reality and virtual reality environments wherein a virtual representation of a non-virtual location is generated by a processor in which a set of all of the elements and a set of all of the players are located and represented. The system creates a first dimensionally precise replica of a physical environment and generates a virtual reality environment which is substantially identical to the physical environment. The physical environment situated therein an ultra-precise indoor positioning system consisting of a series of networked antennas connected to a processor to record, generate and transmit positional and action data. The system and method then permit interaction between both the players within the physical environment and those within the virtual reality environment as if both were located within the same environment.

20 Claims, 7 Drawing Sheets

Physical Environment at Location 1

Physical Environment at Location 2

Virtual Environment

SYSTEM AND METHOD FOR CREATION, PRESENTATION AND INTERACTION WITHIN MULTIPLE REALITY AND VIRTUAL REALITY ENVIRONMENTS

CROSS-REFERENCE TO RELATED PATENT APPLICATIONS

Embodiments of the present invention relate to U.S. Provisional Application Ser. No. 62/682,199, filed Jun. 8, 2018, entitled "SYSTEM AND METHOD FOR CREATION, PRESENTATION AND INTERACTION WITHIN MULTIPLE REALITY AND VIRTUAL REALITY ENVIRONMENTS", the contents of which are incorporated by reference herein in its entirety and which is a basis for a claim of priority.

FIELD OF THE INVENTION

The present invention generally relates to interactive communication technology and cross-platform interaction within a highly scalable network. One or more implementations relate generally to the creation of virtual reality environments that substantially mimic or replicate actual, physical environments, and more specifically to permitting the concurrent interaction of individuals and/or groups within both the virtual reality environment and the physical environment as if in a common environment.

BACKGROUND OF THE INVENTION

In prior art combat games such as laser tags and paintballs, players attempt to "shoot" one another with beams of light or projectiles to remove players from an opposing team from the game. In those instances where a physical object is used, such as a paintball, the resulting spot of paint on the player indicates that the player has been hit and must be removed from active game play. When beams of light are utilized as the simulated projectile, the light beam strikes a suitable receiver on or worn by the player, which senses the beam and provides an indication that the player has been struck by the beam, such as by energizing a light on the player or displaying the player's status on a screen.

The use of infrared (IR) or laser beams overcomes certain problems inherent in the use of physical objects, such as paintballs. Paintballs may not break open or may hit near a player and splatter him, thus improperly causing the player to be deemed "hit". The paintballs also have a chance of causing physical harms to people, thereby are not always suitable for young children. Because the beams will not bounce off of objects or players, they reduce the occurrences of incorrect results and also cause fewer physical harms. However, IR or laser beams create other problems, such as the limited number of locations available on the player to receive and register the IR or laser beam due to the weight of the receivers.

In U.S. Pat. No. 8,366,52 a system is described in which each player participating in the simulated combat game is outfitted with a gun including an infrared (IR) beam transmitter and a receiver that includes a display thereon. The transmitter is capable of sending out encoded IR beams that identify the player from which they came, such that when an opposing player is struck by the beam, the receiver on that player can register the beam as coming from the specific player. In addition, the receiver for each player transmits a record of the shot that was made and the hit to a central command server which registers the hit on the player, and the player who shot the beam. Thus, the central command server can register automatically all of the shots taken and corresponding hits made during game play corresponding to who was hit and who made the shot in a highly accurate manner. This information can also be displayed directly on the displays of both the player who made the shot and the player who was struck to provide an indication of the successful hit.

The system also provides that the transmitter on the gun is operably connected to the receiver, such that each time a player depresses the trigger of the gun to attempt a shot on another player, the gun transmits a signal to the central command server of the particular shot, regardless of whether the shot results in a hit in an opposing player. In this manner, the number of shots taken by an individual player is recorded by the server in addition to the number of hits made by that particular player.

However, the system requires that the beam emitting device have a transmitting system operably connected to it and that the beam detecting device also have such a transmitting system in order to permit two-way communication between the emitter and the detector. The system thus has the inherent problem of precluding individuals who are not in the same location to participate in the activities because of the inability to have the two way communication required by that system. The current invention overcomes that shortcoming and problem and does not require such two-way communication.

Virtual reality (VR) systems simulate an environment by modeling the environment and presenting the modeled environment to users in a manner that allows aspects of the environment to be perceived (e.g., sensed) to give the impression that the user is in the environment to the extent possible. The virtual environment simulated by a VR system may correspond to a real environment (e.g., a VR flight simulator may simulate the cockpit of a real airplane), an imagined environment (e.g., a VR flight game simulator may simulate an imagined aerial setting), or some combination of real and imagined environments. A VR system may, for example, stimulate a user's sense of sight by displaying images of the simulated environment, stimulate a user's sense of sound by playing audio of the simulated environment, and/or stimulate a user's sense of touch by using haptic technology to apply force to the user.

A key aspect of many VR systems lies in the ability to visually display a three-dimensional environment to a user that responds to the user visually exploring the virtual environment. This is frequently achieved by providing separate visual input to the right and left eyes of the user to emulate how the eyes and visual cortex experience real environments. Systems that provide separate visual input to each eye are referred to herein as "stereoscopic" or "binocular." While some VR systems provide a single visual input to both eyes, such systems are typically less immersive as they lack the perception of depth and three-dimensionality of stereoscopic systems. Accordingly, stereoscopic systems generally provide a more realistic rendering of the environment.

To allow a user to explore a virtual environment, a VR system may track the position and/or orientation of a user's head in the real world, and render the visual model in correspondence to the user's changing perspective to create the perception that the user is moving in and/or looking around the virtual environment. The ability to explore a virtual environment contributes to the immersive character of the virtual reality experience, particularly those environments that react to the user's motion or locomotion in the environment.

However, one of the drawbacks in conventional activities involving virtual reality system is that the players within virtual reality are unable to participate activities with players in physical environment and vice versa. Also, when players are participating activities in a physical environment such as sports and laser tag, non-players are unable to view the entire game at whole time. There would at most be some cameras deployed around the physical environment showing players from different angles or a score board displaying players' status. Thus, it would be desirable to have a system in which the players within the virtual reality environment is able to participate activities with players within an identical physical environment. It would also be desirable to have a system where non-players (e.g., people at lobby or people at a remote location etc.) are able to see the entire activity and actions of all of the participants at whole time through a screen on which the participants (i.e., physical players) have their avatars overlaid on a digital representation of the physical environment.

Another system which may be employed to provide an augmented reality employs predefined configurations of physical or geometrical objects by using one or more camera devices in order to capture one or more images of a visual scene that includes object. U.S. Patent Application 2018/0101993 purports to describe a method, computer-readable memory and augmented reality device that includes capturing, using one or more camera devices, one or more images of a visual scene that includes a first physical object and determining a first region of the first physical object to apply one or more augmentations to. It then determines which one of a plurality of configurations the first physical object is currently in. Thus, the first physical object is configured to be physically manipulatable into each of the plurality of configurations.

The device also describes rendering a sequence of frames for display in which the first region of the first physical object is animated in a predefined manner depicting a virtual light source within the first physical object, based on the determined configuration of the first physical object, by applying the one or more augmentations to a first virtual object generated based on predefined geometric information corresponding to a determined object type of the first physical object. The method, computer-readable memory and augmented reality device further include outputting the rendered sequence of frames for display using one or more display devices.

However, this use of cameras is limiting, does not provide accurate information and also does not permit a simultaneous reality and virtual reality interplay, such as is described in the present invention.

Accordingly, there exist a need for a new and/or improved system and method that is capable of providing a mixed reality environment to be accessed by players from virtual reality environment and players within a physical environment. It would be desirable to be able to have mixed reality environments in which the mixing of the real world is an actual real world representation of something which is actually transpiring at that time of the interaction. The present invention provides such a real world add virtual world mixing in order to create a new mixed reality experience.

Mixed reality refers to the mixing of the real world, as depicted by video clip, with a virtual world to generate an environment in which real world and virtual world objects interact in real-time. For example, in a fitness gaming application, virtual avatars representing human runners may be embedded within a video, clip or live stream, that depicts an actual outdoor running environment, and the interaction of the virtual avatars through the real world environment provides a user with a realistic experience as though the user, displayed as the virtual avatar, is able to move and interact with the real-world environment in a realistic manner.

The present invention further relates to the field of packet communications. More specifically, in one embodiment the invention provides an efficient communications network for client-server networks with large numbers of clients. A client-server network is a network where one or more servers are coupled to one or more clients over a communications channel. Typically, each server and each client is assigned an address so that each can determine which network messages are directed to it. While such a system may have only one server, it typically has many clients.

A server object is one which waits for a request from a client object and then performs some service in response to the client request. A client is an object that makes the request. The designation of a particular object (computer hardware and/or software process) as a "server" object or a "client" object is not fixed. Thus, a given object can be a server for some services and a client of other services.

A typical computer network has one or more file and print servers with a number of clients, where the clients are the computers or video screens of the computer users, all coupled to a high-speed network cable. Client-server communications in such a network are easily handled for several reasons. When clients are not all communicating with the server at once the server need not be designed to handle all the clients at one time. Another reason is that the network traffic is much less than the network capacity furthermore, the clients in a typical computer network need not necessarily be communicating in real-time with the server. However, where many client machines or processes are communicating with each other in real-time through the server, several problems arise.

For example, where a client-server system is used for real-time exchange of information, such as a distributed virtual reality or mixed reality network where users at client machines visually and aurally interact with other users at other client machines, communication is much more difficult, especially where the information is high-bandwidth data such as audio streams, graphic images and image streams. One application of such a client-server system is for game playing, where the positions and actions of each user need to be communicated between all the players to inform each client of the state changes (position, actions, etc.) which occurred at the other clients. The server might maintain global state information and serve as a data server for the clients as they request visual, program and other data as the game progresses.

Some game systems use a peer-to-peer architecture. In a peer-to-peer architecture, a copy of the data which is common to all clients is kept by the client and information which needs to pass between clients is broadcast over the network. This limits the number of clients which can be connected to the network, because the number of messages passing between clients is on the order of the square of the number of clients. With true broadcasting, one message is sent and all clients listen for it, but not all network topologies can handle broadcasts. Where less than all the clients are participating in a game, for example, messages cannot be broadcast because there are clients which should not be receiving the broadcast message. Instead, the broadcast between the players is handled by generating one message to each player client.

This architecture is further limited where the network is not a dedicated network, but is an open network, such as the Internet. As used herein, the term "Internet" refers to the global inter-network of networks which communicates primarily using packets sent according to TCP/IP (Transport Control Protocol/Internet Protocol) standards well known in the art of computer intercommunication. With Internet communications, true broadcasting is not even possible because the network's extent is not known or fixed. Thus, messages to all players must be sent as separate messages. An additional problem with Internet communications is that packet delivery is not guaranteed nor is it even as reliable as a dedicated network.

Therefore, what is needed is an efficient system for communication between many client systems over dedicated or open networks to provide graphical interaction between users operating the client systems and among users operating within the physical environment so that there is a true mixed-media interaction between the physical environment and group within virtual environment.

What is also needed is a system for providing precise positioning such that the graphical interaction between the users operating within the physical environment and those operating within the virtual environment generate information and precise data to render the two environments into a unitary activity area. The instant invention satisfies this need as well as others thus permitting the creation of what is tantamount to new game environments which are indistinguishable from the physical locations on which they are predicated.

There is a further need in the art for a system and method that allows for changes and updates to the rules or protocol governing the mixed reality and its data in order to permit effective interactions within the mixed reality environments and provide concomitant security and verifiability for the data in order to permit subsequent interactions and compilations of data in order to provide ranking orders and long term ability data for use in subsequent interactions. The inventions described herein meet those drawbacks and satisfy those long-felt needs.

SUMMARY OF THE DISCLOSURE

The present invention generally relates to interactive communication technology and cross-platform interaction within a highly scalable network. One or more implementations relate generally to the creation of virtual reality environments that substantially mimic or replicate actual, physical environments, and more specifically to permitting the concurrent interaction of individuals and/or groups within both the virtual reality environment and the physical environment as if in a common environment.

Specifically, this invention relates to creating a set of virtual environments according to specific replication rules that allow for multiple valid cross-platform interaction to propagate simultaneously graphical and physical information with a customized set of protocol rules embedded in and applied to the positioning and interaction.

The invention generally provides a computer-implemented system and method for accessing, developing and maintaining either a centralized or a decentralized database through a network, to preserve the original state of data inputs and outputs relevant to the actions being taken by the players both within the physical environment and the virtual environments, while adapting to changing circumstances, user preferences, and emerging technological capabilities to permit the creation of multiple virtual and physical real-time interaction environments.

The invention further provides a computer-implemented system and method for creating, presenting and permitting concurrent interaction by players within multiple reality and virtual reality environments wherein a virtual representation of a non-virtual location is generated by a processor in which a set of all of the elements and a set of all of the players are located and represented.

The present invention provides a highly scalable architecture for a three-dimensional graphical, multi-user, interactive mixed media system. In a preferred embodiment a plurality of users interact simultaneously in both a real space and a precise replica of that space which is created by a three-dimensional, computer-generated virtual reality where each user view a real world or the virtual equivalent of the real world from the perspective of that user. The virtual world shows avatars representing the other users who are either within the real world or are other users viewing the virtual world.

The present invention generates both the physical environment avatar and the participant avatars so that the mixed media experience is the same whether one is present in the physical environment or only present in the virtual one. In order that the view can be updated to reflect the motion of the avatars, motion information is transmitted to a processor which provides position updates to the system and to each of the users who are either within the real world or are other users viewing the virtual world.

It is another aspect of the invention the game engine makes assumptions and movements based upon the speed of the players moving throughout a physical space and those assumptions are represented by the players avatar. Crouching, running, jumping, hand placement etc. are assumed based upon the location of the peripheral which has the transmitting device associated there with in relation to the player holding that device. Once the physical activity is calculated and determined, it is imported into the visual system so that position, heading and actions being taken are accurately mapped on the scale replica of the physical facility, thereby permitting those within the virtual world to interact with those in the physical world.

In a further aspect of the invention the individuals playing within the physical environment have a signal transmitting device (e.g., IR pulsing device) that sends out specified signal(s) upon the individual user's initiation and demand. Each individual who was provided with the signal transmitting device is also provided with a signal receiving device. Depending on the type of activities, the signal transmitting device and signal receiving device can be in various forms and shapes. For instance, if it is a sport game, the signal transmitting device and the signal receiving device would locate on the sporting equipment (e.g., balls, rackets). If it is a shooting game, the signal receiving device may be in the form of vest or other wearable object such as a headband or arm band, that is capable of sensing when it has been subjected to the specified signal(s). The signal receiving device may be carried anywhere upon the individual including being associated with the signal transmitting device.

It is another aspect of the invention to utilize enhanced reality devices (e.g., VR or AR headsets) to permit the individuals within the physical environment to be apprised of the avatar locations and activities of those who are participating remotely and to interact with those remote participants, thus providing a holistic interactive mixed-media environment for all participants.

In yet a further aspect of the invention that each of the players and/or each team is assigned score points associated with the actions taken by the players and/or teams during the course of the activities. These actions may include players scoring in sporting activities (e.g., basketball, dodge ball etc.), getting tagged or otherwise receiving specified signal (s) in shooting activity, and any other applicable scoring method depending on rules and designs of the activities. It is an underlying aspect of the invention that each of the players and teams receives or loses points for accomplishing the game objectives. Both individual and team scores are assigned during the game play and, it is a further aspect of the invention, that scoreboards at the physical facilities and within the virtual facilities are continuously updated in order to provide current scores for the individuals and teams involved.

According to a first aspect of the invention, there is provided a method and system that provides for each player a 3-D avatar associated with their individual account and permits those players to login or join either a virtual world through a virtual reality headset computer or mobile device or participate physically within a physical world and aggregate points either individually or as part of the team, thereby creating a player profile and team profile for future mixed media participation. As part of the invention, the system employs a processing platform or unit which may be comprised of a single processor, a plurality of processors or a combination thereof having a non-volatile computer memory such that the non-volatile computer memory stores computer readable instructions configured to generate the mixed media environment and the associated participation.

According to another aspect of the invention each field or playing area has a precise to scale 3-D rendering created such that it is ascertainable within the virtual reality space and provides a replica of the actual physical space. Within the physical space the players are outfitted with indoor positioning devices such as UWB or Bluetooth transmitters that are capable of emitting signals indicative of location, heading, speed and other physical attributes of the players within the physical environment.

It is yet a further aspect that the physical facility will be outfitted with ultra precise indoor positioning systems capable of receiving the transmissions from the indoor positioning devices and relaying the transmitted data to one or more processors in order to provide real-time positioning and movement data for the individual.

It is a further part of the invention that each player will be provided with a transmitting device (e.g., infrared, motion sensors, locations sensors etc.) which will be uniquely associated with that individual such that it will identify the individual and be able to detail the signal (e.g., pulse) or other actions taken by that individual and report those to the processor in order to provide an accurate real time assessment of the individual's activities and location.

As part of the implementation of the invention, players' avatars are overlaid onto the players' position in real time as reported by the indoor positioning system (i.e., sensors). As players take action such as transmitting or receiving designated signals (e.g., IR or other types of signal pulses) or performing designated actions (e.g., throwing, dodging and jumping etc.), those actions are reflected by the avatars representing the players within the environment and are seen by those players who are participating via the virtual game area or non-players within the gaming facility. If an individual receives a designated signal or meets certain conditions (e.g., standing within the path of a simulated projectile such as an incoming dodgeball or laser beam), that may result in the individual being eliminated from the game or, depending on the rules of the game, may result in the individual being otherwise incapacitated or unable to take future actions or simply lose points. All of these will be determined by the rules of the particular game that is being played.

It is part of the invention that by combining the above information the system is able to create a virtual representation of the gameplay happening on the field and deploy that virtual representation throughout the participating community either via live stream or other substantially contemporaneous display medium in order to permit multilocation interaction. Two of you were within a virtual location, the feed would appear as if a video game was being played. However, to the people who were physically within the space and/or controlling the avatars, they are each essentially acting as a controller by their own activity and movement. This is particularly helpful for players with disabilities to participate in the same activities with players within a physical environment.

In yet a further aspect of the invention the players are able to earn or purchase different avatars and are able to earn or purchase special animations, tools or other items for their avatars better represented on the screen. Thus, the avatar can be wearing, carrying or using various implements each of which is directly correlated to the game and maybe employed according to the rules of the game.

It is part of the invention to permit the re-creating to scale of physical environments for use within a virtual gaming environment. The ultra precise mapping of each physical gaming environment permits the effective creation of new real estate by permitting the replication of each physical environment into a virtual environment. Thus, the virtual world that is created will feature all of the entertainment aspects of the real world and will permit participants to go between different entertainment types within a network each of which is represented virtually to scale as they are built in the physical world. The system will create a scale rendering of each facility and a player may choose any of the virtual entertainment centers within the virtual world and visit that center.

A visitor within a virtual world will be allowed to gain access to the entertainment within that world either for free or may be charged in admission. The players within that virtual world be able to see a precise scale replica of the physical location including all of the ancillary facilities such as lobby, the bar and other entertainment areas in which each of the games maybe play. Thus, an individual may enter an entertainment world in which multiple games such as laser tag, archery tag, go carts roller coasters etc. maybe located and join into each one of those as if he were physically present.

When an individual is participating in any of the games their score will be tracked and their physical presence detected and made part of the gaming environment. Moreover, an individual may choose to participate in more than one game and the system has the ability to aggregate points and other indicia of success into a single platform, across multiple different entertainment and gaming verticals both in the virtual and physical world. Points may be aggregated, exchanged for coins or other gaming currency which can then be reemployed elsewhere within the system.

As a further part of the invention, participants may have different avatars for different activities and may aggregate points for each of those avatars. Similarly, they may choose to have a single avatar for multiple activities and obtain ratings and points for that single avatar over a variety of gaming activities.

In a further aspect of the invention, points or coins may be earned through time and that currency may be based upon a fiat based currency, a block chain based currency or some other form of compensation to pay for the experience and to be aggregated for use in further and future experiences.

While the above discussions have been centered around the aggregation of points by a single avatar or an individual having one or more avatars, the system is also intended to, and it is part of the invention of that, team scores may be aggregated. Thus, the identification system given to an individual may be linked to an identification system for a team on which the individual as a participant. A group can participate both in the physical location and virtually and engage in a game against another group such that each group knows its own members and is capable of identifying the opposing groups membership.

When a game is about to start a Game Server (GS) processor (or system server processor) sends out the game configuration to all associated devices participating in the game (e.g., sporting equipment, vests, headsets etc.) so they know who is on what team and what the basic rules of the game are.

During game play the transmitting device and receiver on each player within the physical environment is primarily responsible for the action of the game (e.g., detecting or sensing players' motion, creating simulated projectile etc.), understanding when a participant (whether a virtual or a physical participant) has been tagged (eliminated) or met certain gaming condition or rule (e.g., positioning within path of simulated projectile).

When key events happen, like a player getting tagged or meets certain gaming condition, these are sent to up to the GS via wireless networks (e.g., Wi-Fi). The server then assigns score points associated with these actions based on the game type and rules governing the game. Both individual and team score points are assigned and the scoreboards at a facility are updated.

When the game is over the GS sends out a message or signal to all the devices that the activity is over. Throughout the activity, the GS collects and calculates the statistics of players and displays that information both at the physical facility where the players are playing and on the gaming devices (e.g., enhanced reality device such as AR and VR headsets or mobile devices) being employed by each of the players who are not present within the physical location. Depending on the types of the game played, these statistics may include:

Score: this is game specific and follows the rules for each game. In general players and teams receives points for tagging other players and accomplishing game objectives (like capturing a flag in a Capture the Flag game).

TOR: Tags/Outs ratio. This is the number of players a participant has tagged divided by the number of times the participant was tagged. So if one has tagged 8 players and got tagged 5 times yourself, then your TOR would be 1.6

Accuracy: This is the number of times a participant has tagged another player with an action divided by the number of actions that participant has attempted. So if one attempted 112 actions and 64 of those actions marked players from another team, one's accuracy would be: 57.1%

PerfRating: Every player gets assigned a performance rating at the end of the game. This is a fairly complicated calculation that differs from one type of game to another, but it essentially looks at how one is expected to perform (ranking level versus the ranking levels of opponents) and compares that to how one actually performed. A PerfRating of 100 means a participant 'performed as expected for their level'. A higher rating means the participant exceeded expectations and under 100 means they under-performed.

The system of the invention employs a terminal device which may have storage, in which computer instructions are stored and a processor which may be implemented in the system using hardware, software, firmware, non-transitory computer readable media having instructions stored therein and may be used to implement the methods set forth above or hereinbelow as further shown in the Figures and Detailed Description and Claims.

The subject matter of this application may involve, in some cases, interrelated products, alternative solutions to a particular problem, and/or a plurality of different uses of a single system or article.

The foregoing and other objects, features and advantages of the present invention are more readily apparent from the detailed description of the preferred embodiments set forth below, taken in conjunction with the accompanying drawings.

DETAILED DESCRIPTION OF PREFERRED EMBODIMENTS

The following description is not to be taken in a limiting sense, but is made merely for the purpose of illustrating the general principles of the invention, since the scope of the invention is best defined by the following claims. Various inventive features are described below that can each be used independently of one another or in combination with other features.

For purpose of the present disclosure, the term "enhanced reality device" and "enhanced reality headset" are used synonymously and they refer to a device which makes possible the superposition of a virtual 3D or 2D model onto the perception of reality that people have naturally, and does this in real time. This device can apply just as well to visual perception (superposition of a virtual image on real images) as to proprioceptive perceptions such as tactile or auditory perception. The enhanced reality device includes, and is not limited to, both virtual reality (VR) device and augmented reality (AR) device.

Broadly, embodiments of the present disclosure generally provide a system for creation, presentation and interaction within multiple reality and virtual reality environments (i.e., creating a mixed media environment). While the embodiments below and the drawings illustrate the present disclosure with a laser tag-like activity, it is not meant to limit the present disclosure to similar activities. The present disclosure can also apply on other sporting activities and non-combative activities.

Figure 1:
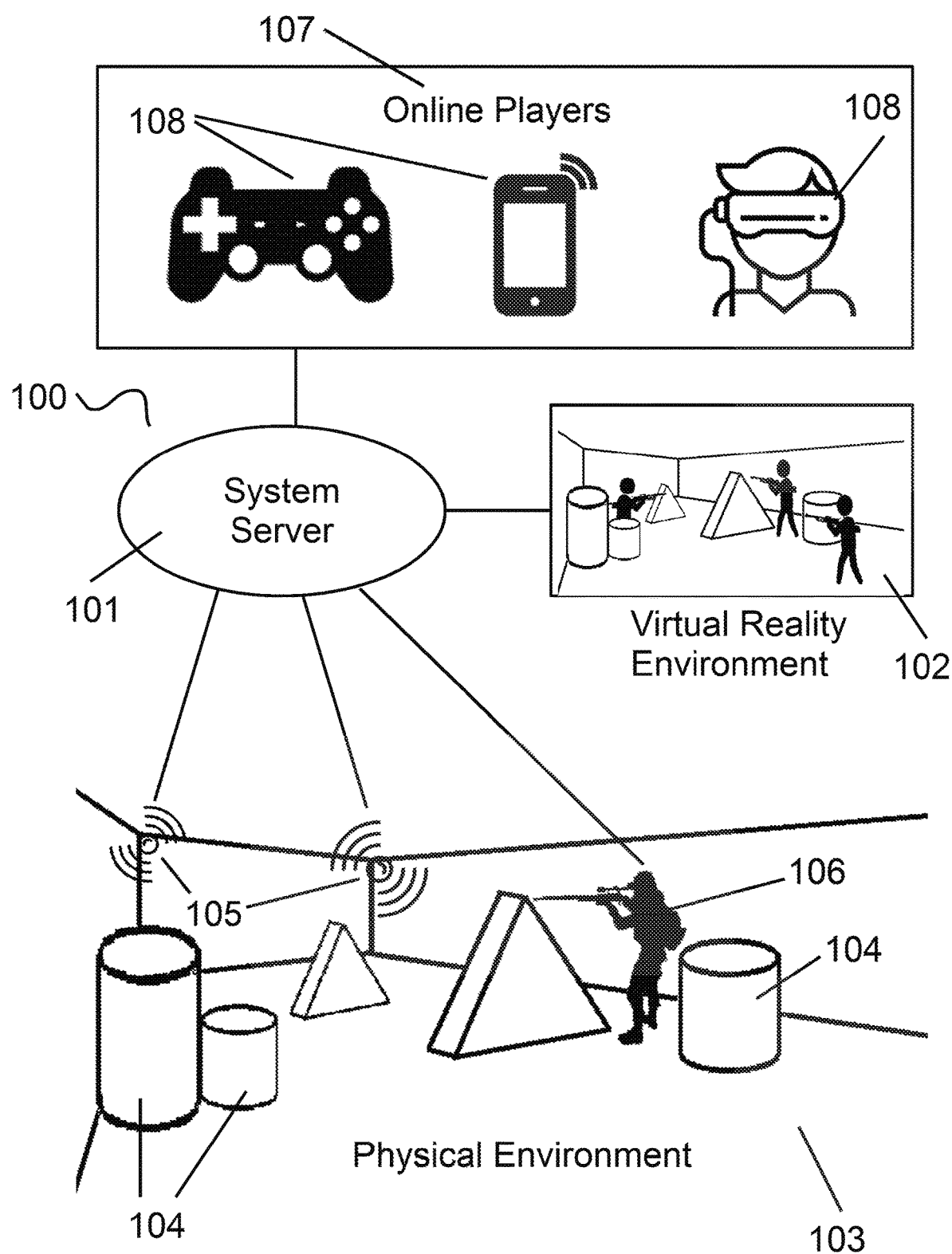
FIG. 1 is a schematic diagram according to an exemplary embodiment of the present disclosure.

In one embodiment, as shown by FIG. 1, the disclosed system 100 comprises: 1) a system server 101 that provides online players 107 access to a virtual environment 102, wherein the virtual environment 102 is created based on a physical environment's 103 appearance and physical objects 104 locating within the physical environment 103; 2) a plurality of sensors 105 (e.g., indoor positioning system) that are connected to the system server 101, where they detect and sense locations and movements of players 106 within the physical environment 103; and 3) a plurality sets of enhanced reality devices (e.g., enhanced reality headsets), transmitter and receiver that are connected to the system server 101, where each set of headset, transmitter and receiver is equipped by each of the players 106 within the physical environment 103. Note that the transmitter and the receiver may be part of the enhanced reality devices or they can locate on different devices, equipment or peripherals depending on the activities players are engaging. The online players 107 are configured to access the virtual environment 102 by connecting their computing devices 108 to the system server 101, where online players 107 may navigate themselves and perform designated actions within the virtual environment 102 using the computing devices 108. The plurality of sensors 105 transmit locations and movements of players 106 within the physical environment 103 to the system server 101, and the system server 101 displays their locations and movements in the virtual environment 102 as avatars so that online players 107 would see locations and movements of players 106 within the physical environment 103 through online players' 107 computing devices 108. The computing devices 108 can be mobile devices, computers, gaming consoles and/or enhanced reality devices.

Figure 7:
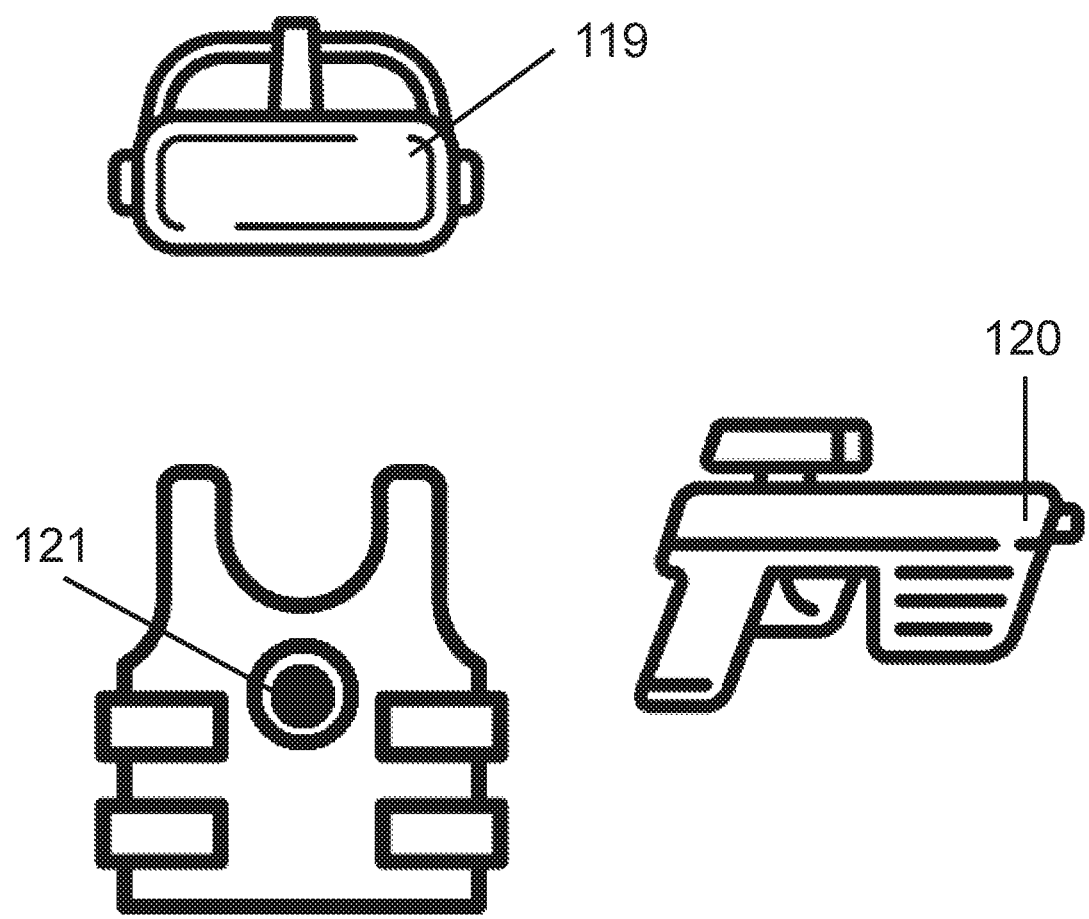
FIG. 7 is a schematic diagram according to an exemplary embodiment of the present disclosure.

The enhanced reality device, as shown by 119 of FIG. 7, is configured to display locations and movements of the online players 107 and their designated actions in the physical environment 103. For instance, if an online player 107 is standing behind a pillar in the virtual environment 102, the players 106 within the physical environment would see the online player 107 (as an avatar) standing behind the same or the corresponding pillar in the physical environment 103 through the enhanced reality device. The transmitter and the receiver enable players 106 within the physical environment 103 to interact with the online players 107 and vice versa, such as playing sporting games (i.e., dodgeball, frisbee etc.) and shooting games (i.e., laser tag and pinball) in a mixed reality environment. The system server 101 records the interactions among online players 107 and players 106 within the physical environment 103, and the system server may generate a score for each player based on the interactions depending on the rules defined or programmed in the system server 101.

Transmitter 120 can be any device that generates designated signals (e.g., IR or other types of signal pulses) and/or detects designated actions (e.g., throwing, dodging and jumping etc.). Thus, the transmitter 120 may include or in connection with other types of motion and location sensors. For example, in an embodiment as shown by FIG. 7, transmitter 120 is configured to be an infrared (IR) emitter containing a unique identification identifying player who equips it and the receiver 121 is an infrared receiver that receives infrared emitted by other transmitters. In this embodiment, the transmitter 120 is configured to create simulated projectile (such as laser or bullet) and the receiver 121 is configured to receive the simulated projectile. Thus, the transmitter 120 is incorporated into a toy gun for a player to trigger simulated projectile and the receiver 121 is placed on a vest to be worn by a user. The transmitter 120 can further be attached to a microcontroller or processor (not shown in the Figure) which detects the direction of the simulated projectile and determines whether the simulated projectile hits another player within the same physical environment or another player within the virtual environment. For example, this can be done if the system detects that a player is positioned within the path of the simulated projectile.

In yet another embodiment, the system server 101 makes movement assumptions to players within physical environment based upon their movement and speed, and the movement assumptions are incorporated to the avatars in the virtual environment 102.

Figure 2:
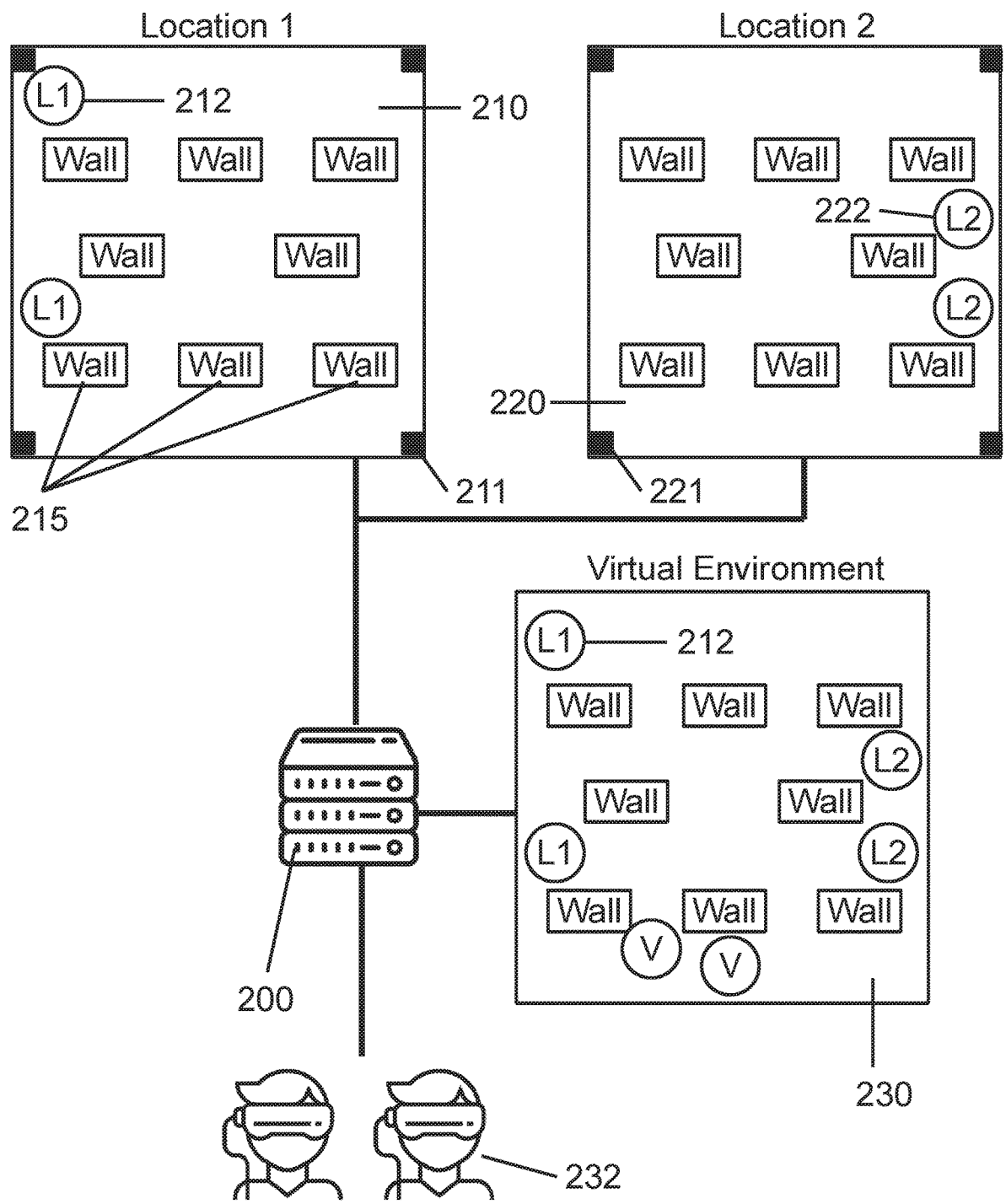
FIG. 2 is a schematic diagram according to an exemplary embodiment of the present disclosure.
Figure 3:
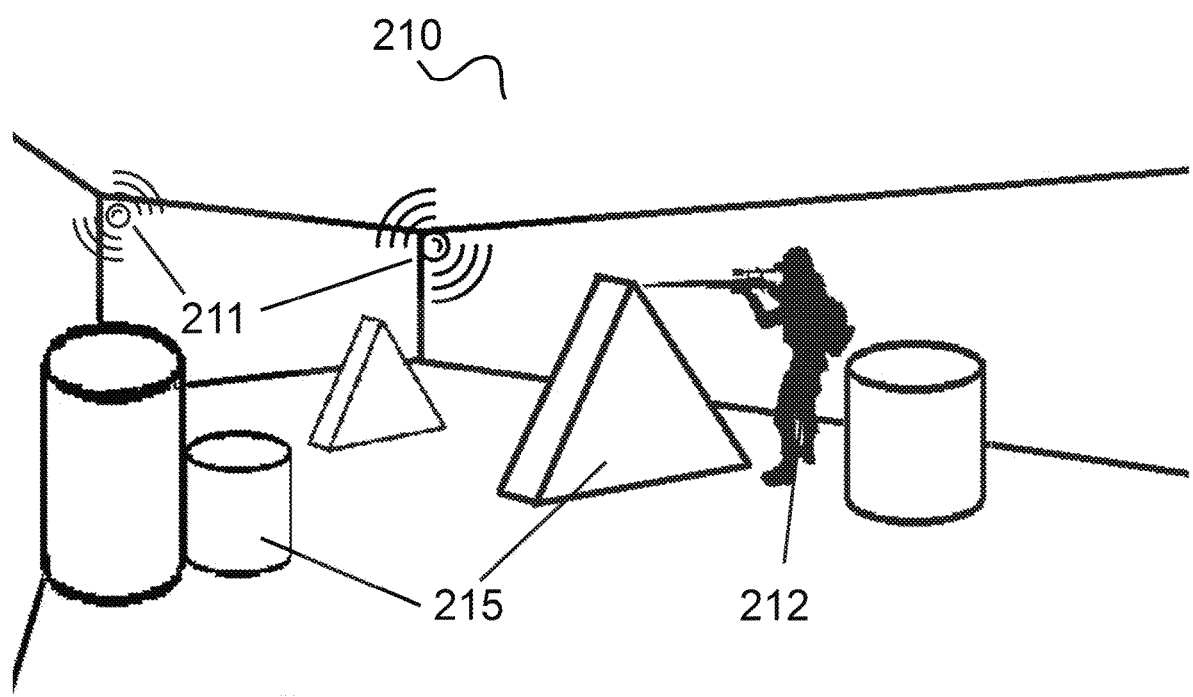
FIG. 3 is a schematic diagram according to an exemplary embodiment of the present disclosure.
Figure 4:
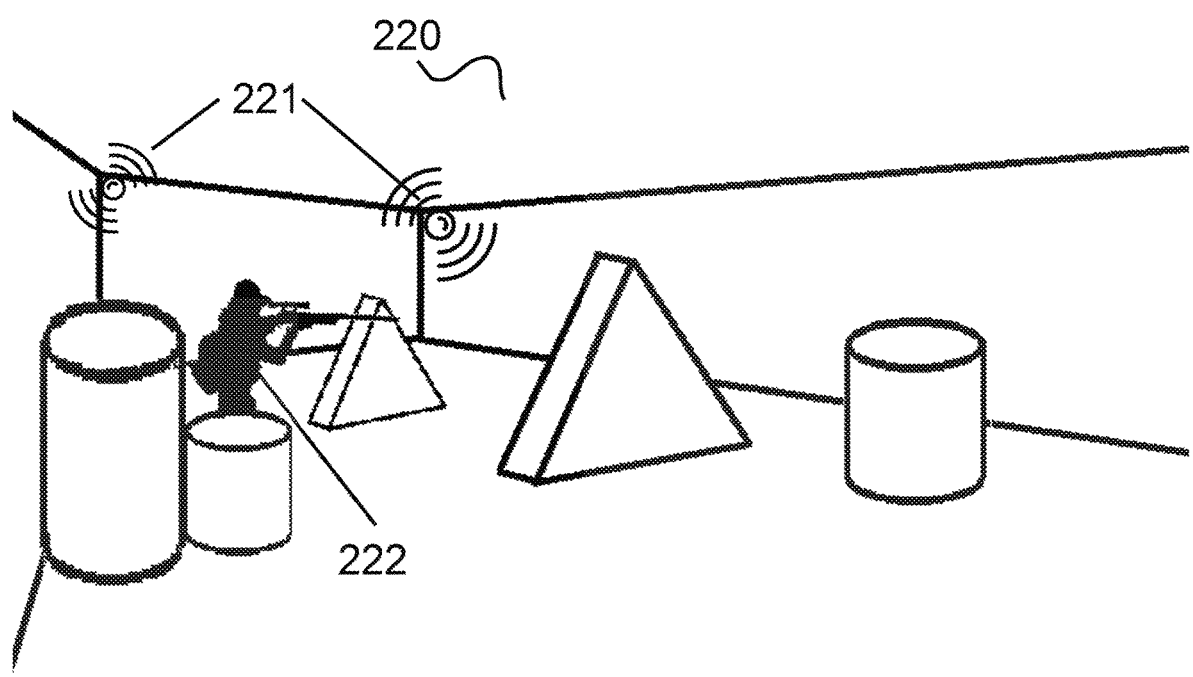
FIG. 4 is a schematic diagram according to an exemplary embodiment of the present disclosure.

In yet another embodiment, the present disclosure is applied on a multiple physical environments setting instead of one physical environment. As shown by FIGS. 2 and 3, a first physical environment 210 is created at a first location and a plurality of physical objects 215 (e.g., obstacles and barriers such as barrels and walls) are placed within the first physical environment 210. A second physical environment 220, as shown by FIGS. 2 and 4, is then created at a second location that mimics the first physical environment 210 including the arrangement for plurality of physical objects 215 in the first physical environment 210. Similarly as shown by FIGS. 2, 5 and 6, a virtual environment 230 is created in a system server 200 based on the first physical environment 210 and the plurality of physical objects 215, wherein the virtual environment 230 also mimics the first physical environment's 210 appearance and shows locations and shapes of the plurality of physical objects 215 within the first physical environment 210.

Figure 5:
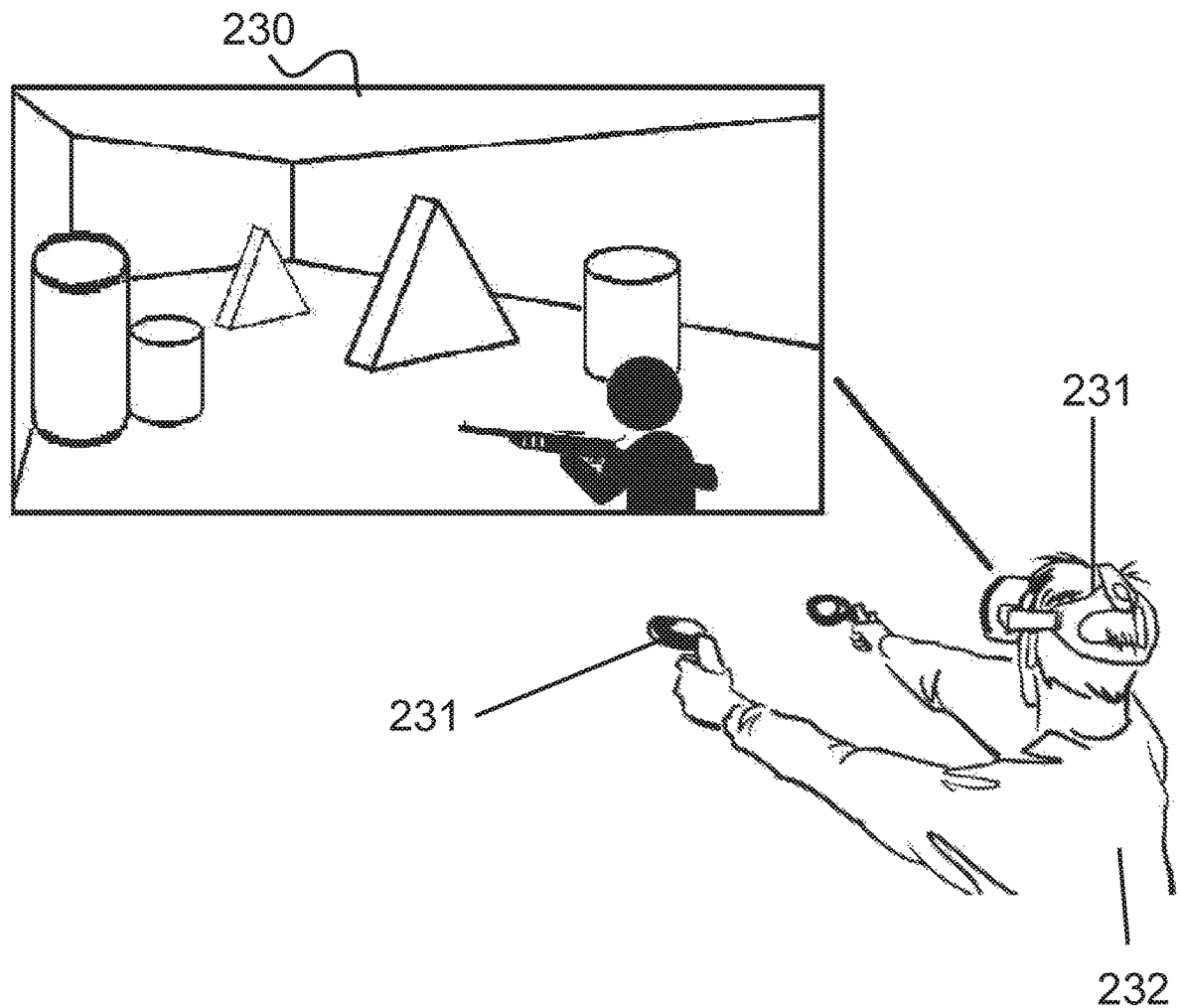
FIG. 5 is a schematic diagram according to an exemplary embodiment of the present disclosure.
Figure 6:
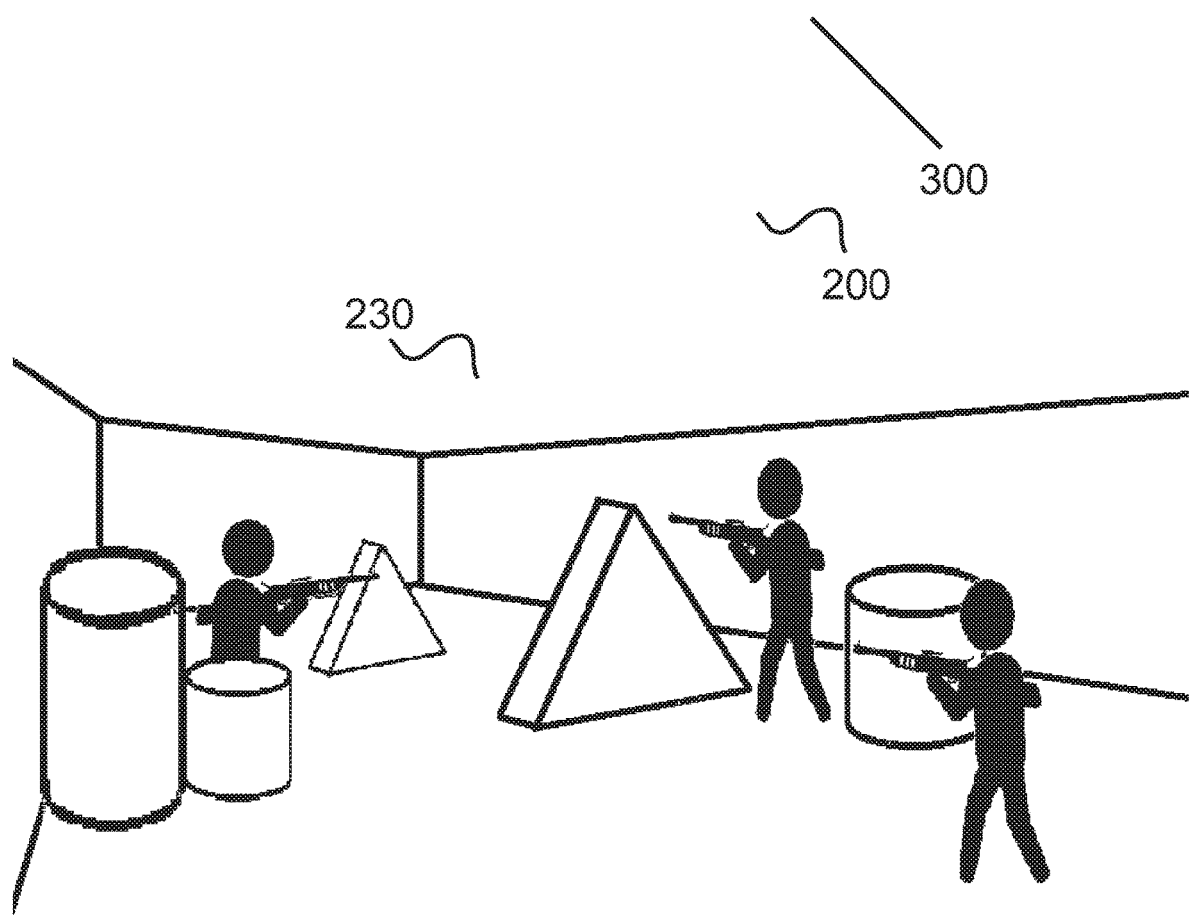
FIG. 6 is a schematic diagram according to an exemplary embodiment of the present disclosure.

As shown by FIGS. 2 and 5, online players 232 are provided with access to the virtual environment 230 via computing devices 231 such as mobile devices, computers, gaming consoles and/or virtual reality headset, where online players 232 can navigate themselves and perform designated actions (i.e., actions programmed in the system server 200) within the virtual environment 230 through their computing devices 231.

As shown by FIGS. 2, 3 and 4, a plurality of sensors (211, 221) and/or indoor positioning system are deployed in various places of the first physical environment 210 and the second physical environment 220 and optionally on the players in both physical environments (210, 220) as well if higher accuracy is desired. The plurality of sensors (211, 221) detect and sense locations and movements of players 212 within the first physical environment 210 and players 222 within the second physical environment 220. The plurality of sensors (211, 221) then transmits locations and movements of players 212 within the first physical environment 210 and players 222 within the second physical environment 220 to the system server 200, where the system server 200 displays players' (212, 222) locations and movements in the virtual environment using avatars. Each of the players 212 within the first physical environment 210 and players 222 within the second physical environment 220 is equipped with an enhanced reality device 119, a transmitter 120 and a receiver 121 as shown by FIG. 7.

As previous mentioned, the enhanced reality device 119 is configured to display locations and movements of the online players 231 and their designated actions in the physical environment (210, 220) and also players who are at different locations. For examples, players 212 at first physical environment 210 would also see players 222 at second physical environment 220 via the enhanced reality device 119.

In one embodiment, the transmitter 120 is configured to create simulated projectile (such as a flying ball or bullet) and the receiver 121 is configured to receive or detect the simulated projectile. The transmitter 120 may further include or attach to a microcontroller, processor and/or sensor(s) (not shown in the Figure) which detect the direction of the simulated projectile and determines whether the simulated projectile hits another player within the same physical environment or another player within the virtual environment. The system server 101 records how many simulated projectiles were launched and how many simulated projectiles were received for each of the online players 232 and players 212 within the first physical environment 210 and players 222 within the second environment 220, and may turn them into scores if necessary. Further details regarding creating mixed media environment is discussed below.

1. Creating the Mixed Media Environment

Preferably, the physical environment should consist a series of walls, obstacles, parapets and other indicia of the physical environment such as would be seen in typical playing fields (e.g., playground, exercise yard, laser tag etc.). The physical environment may consist of a multiplicity of different rooms or a single room having a multiplicity of objects therein. Each room employed for a specific game will have its own set of items therein which will comport with the normal and usual elements to permit the playing of a specific game according to the game's specific rules.

As can best be seen in the figures, a number of obstacles and other game specific items are deployed within the physical space. For purposes of the specific transformation, the items are maintained within a specific configuration so that the physical environment may be replicated into a virtual one.

In one embodiment, the transformation is initiated by obtaining building plans for the gaming space as a baseline. It is to be understood that these are merely illustrative and that the instant invention is applicable to any form of gaming facility where there is a physical structure within which the game is played. The information from the building plans is then inputted to permit a processor to generate a scale replica of the physical space including precise locations of all walls, obstacles, props, lighting and other relevant items which affect the playing of the particular game.

Once the building plans are inputted, the height and other parameters of the physical structure are similarly calculated and derived to create the vertical, virtual boundaries identical to the physical boundaries that are found within the physical space. In this manner halls, obstructions, hiding places, etc. are replicated. By way of example a game engine such as Unity may be employed to assist in the generation of the physical walls, props, lighting etc. and to integrate those precise features into the processor generated virtual space as part of the instant invention.

As the scale replica of the physical space is created, it is constantly matched against the plans and actual physical space in order to ensure precise replication. In order to further enhance the overall reality of the virtual space, each of the areas of the physical space in the entertainment center is replicated. Thus, by way of example, the entrance area and lounge area within an entertainment center will be replicated and created as a virtual entrance and lounge area to permit a participant within the virtual space to be able to pay at the entrance and to acquire the necessary implements to permit them to play the game of their choosing. Moreover, this will permit both the virtual players and the players within the physical space to congregate in the lounges and common areas as if they were all within a single space.

The physical facility (or physical environment) will have dispose therein a series of networked antennas (or a plurality of sensors) operably connected to the processor. The antennas are disposed so as to provide a series of coordinates in the X, Y and Z axis and to permit triangulation in those axis to generate a precise coordinate for any received signal to those that antennas.

The antennas are each adapted to receive input data from each of the transmission devices located within the physical environment and to generate output data to those individuals within the physical environment who are wearing virtual reality headsets, as well as to those who are participating through the virtual environment. Thus, it will be appreciated that in order for the antenna system to both receive and deliver information there needs to be associated with each of the players within the physical environment a data transmission device and the data receiving device.

Similarly the virtual players, by their activity within the virtual space will generate input data to the processor and receive output data from the processor which will provide them with the coordinates of their Avatar representation within the physical space and the XYZ coordinates of the physical players within the physical space.

In order to provide the interactive data, each of the players within the physical space will be provided with a gaming implement in accordance with the rules of the game. Thus, if one were playing laser tag, a tag device capable of transmitting a beam or similar signal would be provided to each player. The player would also have associated with the tag device a constant or rapidly intermittent transmission element which would permit the multiplicity of antenna to pick up the X, Y and Z coordinates of the tag device and from that data generate movement activity which would be used to effectuate the representative movement of the physical player's avatar, as seen by the virtual players.

In the preferred embodiment of the invention a facility located anywhere in the world and having a sufficient transmission connection may participate in this new mixed-media universe. It is a further preferred embodiment of the invention, a single facility may actually be able to spawn itself and have a virtual presence in other parts of the world and thereby permit players throughout the world to participate as if they were within the physical environment.

It will also be appreciated that computer program instructions can be stored in a computer-readable memory capable of directing a computer or other programmable data processing apparatus to implement any and all of the depicted functions. The computer program instructions can permit entertainment centers throughout the world to provide identical virtual entertainment centers and thereby augment their user base as if they had physically enlarged or created additional physical facilities for users to participate in. It will be appreciated that the instant invention has effectively created new real estate for gaming uses and has overcome a problem inherent in any physical space which is the limitation on the number of individuals who may participate at any given time.

As will be demonstrated hereinafter, it is part of a preferred embodiment of the instant invention to provide virtually limitless activity for groups of individuals who wish to participate in a gaming center. By providing user specific identification, multiple games can be engaged in within the physical and virtual environment between multiple teams each without interfering with the other.

The equipment (e.g., enhanced reality device, transmitter and receiver etc.) provided to each physical player on-site has associated therewith a specific identifier which is linked to a player's profile within the processor and game engine. The unique identifier is given to a player in order to permit that player to generate a profile after playing one or more games and to retain that profile for subsequent game playing activity both in the physical space and within the virtual experience.

The equipment may vary depending upon the game being played but, for purposes of the instant preferred embodiment described herein, a tagging device will be described. The tagging device will have associated therewith a transmitting device which will, on a fairly continuous basis, transmit a unique identifier associated with a particular physical player. That unique identifier will be transmitted to the multiple antenna which will, through the triangulation and generation of XYZ coordinates, locate the physical player within the physical environment.

The game engine will also, based upon predictive and analytical software which is part of the processor controlled output, indicate the direction of motion, speed of motion and activities of the physical player and provide a graphical representation of those activities through the physical player's avatar. Crouching, running, jumping, hand placement and other activities are calculated based upon the location of the transmitting device associated with the tagging device.

The tagging device further has associated therewith a unique identifier that generates a unique transmission beam or other rule-based active transmission. When a specific player activates and seeks to tag someone within the physical environment, a record of that tagging event is transmitted and that information is secured by the networked antenna system and transmitted to the processor. If the tag is successful, it is recorded upon the player who has been tagged through a player receiving device which is capable of analyzing and determining the player unique identifier of the transmitted beam.

In a specific preferred embodiment of the invention, the processor would receive information from a first player that they had taken action to tag a second player and would record whether that second player had in fact been tagged. That information would be provided both to the other physical players within the physical area and to the virtual players.

As can be appreciated in figures and disclosures, any physical locations maybe replicated to create a virtual locations where the physical locations or gaming areas providing activity space for any of the number of single or multiple participant games.

2. Playing in a Mixed Media Environment

In a first scenario, an individual decides to play a game where they are provided with a signal generating device and/or motion detecting device in accordance with the rules and requirements of a particular game to be played. Upon commencement of the game the game server (or system server) processing system sends out all the rules for that particular game to each device. These include, without limitation, what constitutes damage or score to each type of device, how much damage or score does a particular action receive, the number of hits or action taken at it takes to totally incapacitate a device, the actions required by an incapacitated device to be reactivated, and the general parameters of how many individuals will be playing the particular game.

At the time that the game server processing system is providing the rules of the game, it is simultaneously sending out to all players the profiles and rankings so that each is aware of the current profile that they have and the profile of the other players within the game.

If a second player (player 2) were to tag player 1 with a beam or throwing a simulated projectile at player 1, the following will illustratively occur. The simulated beam will have an encoded packet of data indicating the profile of the individual from which the beam emanated, the type of projectile being emitted/thrown and, to the extent that the individual was playing with a team, the profile and information regarding that team. For virtual players without physical equipment, the system will trace the location of players and path of simulated projectiles to determine whether the player is hit. The sensor on the device which is hit by the beam identifies the unique encoded packet as coming from a player who is not associated with player 1 and therefore is from an opposing team, determines whether, according to the rules of the game, it has been disabled and if so disables the beam emitting capability of player 1. That data is similarly transmitted via the antenna to the game engine processor which thereby advises that player 1 is eliminated until such time as player 1 can be reactivated or "spawned" to play again.

As a further part of the invention and preferred embodiment, the data that player 1 has been eliminated by player 2 is employed to calculate a new profile for each of the players and, during the course of the activity and game, the data is compiled and provided both within the physical environment to those players participating therein and to the virtual environment so that those players who are playing virtually know the status of each of the players.

In yet another embodiment of the present invention, the players are provided with both an IR beam emitting device which is capable of transmitting both the IR encoded beam packet and beam reception data and a second beam receiving device such as a player vest or headband. In this second preferred embodiment when player 1 is hit by an IR encoded packet sent by player 2, both the beam transmitting device of player 1 and the beam receiving device reflect that the player 1 has been eliminated. Player 1's vest or headband may light to reflect that player 1 has been eliminated while simultaneously causing player 1's beam transmitting device to be disabled thereby eliminating player 1 from the event until such time as player 1 has been reactivated.

This information is transmitted either by the beam emitting device's transmitter of player 1 or player 1's beam receiving device. In either event the data is transmitted to the game engine processor and the game engine will process the information depending on its settings such as turning them into scores and/or change player 1's status. The game center may also transmit it to all players participating within the game currently and provides updates in scoring for the teams.

A further preferred embodiment of the invention provides data of when and how a particular individual has been tagged and may be alternatively transferred to the game engine processor through the alternative use of the transmission device associated with another player in proximity to the player who has been tagged. Such transmission maybe referred to as a mesh network which, rather than providing direct signals to the game engine via a router, uses the intermediate step of transmitting the data through the transmission system associated with the nearest player to the affected player. This data runs along the mesh and is then provided to the game engine. Various alternatives for the transmission of this data are within the scope of the invention and may be employed by those skilled in the art to practice it. Nonetheless, regardless how information is passed to game engine, the game engine would be responsible for collecting and using this information. The mesh devices would simply act as a carrier for the messages or signals being transmitted.

Although the description of above has been in terms of players within a physical environment, the following is a preferred embodiment of the invention in which players are both within the physical environment and outside of it and are able to participate within the mixed media environment created. Players participating within the physical game environment may either wear virtual reality headsets, in which case they will be able to see and interact with avatars of those who are playing within the virtual replica of the physical space, or they may choose not to wear such headsets and play solely within the physical environment. In the latter instance they will be seen by the players within the virtual environment and therefore the persons within the virtual environment may participate against the ones in the physical environment but the converse would not be permitted.

In yet another preferred aspect of the invention where both the players within the physical environment and the players within the virtual environment are interacting each player would have a 3-D avatar associated with their account and profile. Assuming that they were playing in a particular game environment, each would see the identical three-dimensional embodiment of the physical environment. Those players within the physical environment would have a transmission associated device which would be capable of imitating a signal to the antenna within the physical environment. The data from the transmission device which is captured by the antenna is transmitted to the processor to permit it to calculate the location, heading, speed and other actions by the players within the physical environment. That data is that employed to position the avatar associated with each individual in the physical environment and provide that avatar with the identical location, heading, speed and other motions within the virtual environment. The players' actions on the field are tracked through the transmission device. That device also transmits other data such as tags or shots fired and hits or such other disabling activity as may occur.

In the instance where the players within the physical environment are participating using virtual reality headsets, each player's avatars are overlaid by the processor so that both the players within the physical environment and those within the virtual environment have an identical representation of what is transpiring. The player within the virtual world may enter the game through either a virtual reality headset, computer, mobile device, television enabled display and related hardware to permit interaction. Although players at home will not actually be able to physically move within the actual physical space, their avatars will be able to do so. Their avatars will be constrained by the virtual walls and props in a similar manner as the participants within the physical space would be so constrained As the game continues, scoring will be provided for a particular game and will be used to calculate the profile of each of the players and each of the teams on which they are playing. Points can be aggregated and viewed online and can be seen in both virtual and physical world. Thus, for example, within the physical world a scoreboard can be posted to permit both players who are physically present and those who maybe watching the game you know which group is "Winning" and which players are either still active or have been eliminated. Similarly, the game rules may permit players who have been eliminated to rejoin the game after a period of time and thus will provide information during the course of the game of which player is currently inactive but can rejoin after a given period, such as might happen in hockey, basketball or other games where players may be benched for a period of time.

In a further preferred embodiment of the invention players may participate across multiple entertainment and gaming verticals and platforms both in the virtual and physical worlds. Illustrative entertainment verticals may include, but are not limited to, bowling, laser tag, go carts, dodge ball, archery tag, putt putt and other games. Similar gaming may have an individual operating and playing against virtual avatars from another team or the gaming engine may generate fictitious avatars as part of the game playing. It is also part of the preferred embodiment that the players both within the physical space and those playing remotely may acquire multiple avatars and may earn or purchase special attributes for their avatars. By way of example an avatar may have multiple beams emitting devices, may be able to acquire special armor, may be able to become invisible under certain circumstances, and otherwise obtain traits and characteristics that would not be available in the physical world. It is also part of the preferred embodiment that a player may participate in any of the number of physical games that are being played without the necessity of being part of the team.

In yet a further part of the preferred embodiment participation in sessions or games may be provided to individuals without payment or may be subject to payment based upon the game, the level of participation, the number of individuals and other factors at the discretion of the entertainment center which is part of the accessible gaming world generated by the processor system in accordance with the invention. Payment may be done either through crypto currencies, normal currency transactions, some specially designed currency applicable to the system or other modes of transmission of fees by players operating remotely. Players within the physical space similarly made use special currency, crypto currency or normal currency all the discretion of the operator.

3. Scoring within the Mixed Media Environment.

When the game is about to start the Game Server (or system server) sends out the game configuration to all the player devices/equipment/peripherals so they know who is on what team and what the basic rules of the game are. During game play the player devices are responsible for the action of the game (e.g., creating simulated projectile, throwing ball etc.), understanding and responding when a player meets certain condition (e.g., receiving a designated signal or pulse or positioned in a path of simulated projectile) and when player's status changes (eliminated from or respawn back into the game etc.). When key events happen, like a player getting tagged, these are sent to up to the game servicer, either directly or via a mesh network. The server then acts accordingly such as assigns score points associated with these actions based on the game type. Both individual and team score points are assigned and the scoreboards at the facility are updated.

When the game is over the GS notifies all the player devices that the game is over and process all information received from player devices and generate statistics for both the game and the players to display on the on-premise signage. These statistics include: So for example, assume a small game of 4 players:

a. Alpha Team:

Player 1, rank 11->Score: 3000, TOR: 2.3, Accuracy: 34.3%

Player 2, rank 17->Score: 2300, TOR: 1.8, Accuracy: 54.3%
b. Bravo Team:
Player 3, rank 21->Score: 2800, TOR: 2.1, Accuracy: 39.6%
Player 4, rank 14->Score: 1300, TOR: 2.4, Accuracy: 44.7%
c. If we look at player 1. She has a ranking of 11 which compared to the other teams rankings of 21 and 14 means that she is out ranked for this match so we would expect that she be bested by her opponents.
d. However when we look at the results, she took 1st place in Score, 2nd place in TOR and was dead last in Accuracy. Taking all three of these into account (we weight them giving score a heavy weighting of 5×, TOR is weighted at 2× and Accuracy receives a single 1× weighting), Player 1 would receive of performance rating like 219, which means they outperformed the expectations.
e. Player 4 on the other hand would probably receive a performance rating of 89, meaning they slightly underperformed given who their opponents were (a level 11 and a level 17)

Generally, score is the only metric/statistic that is calculated in real-time because that is required for players to know how the game is progressing. The other data/information may or may not be calculated until after the game when the devices have fully uploaded all of their data. Depending on the game, the game server parameters and the processor or processors employed, along with the computer implemented instructions, it is within the scope of the invention to permit either iteration. This may also be a function of the number of data points that are to be employed in the calculation, how many devices are reporting information and how heavy of a load the server is experiencing.

These results may be the only ones displayed at the local establishment. It may be possible to view these scores remotely as the game is happening if the data and calculations are performed in real time and are uploaded and relayed as part of separate data stream to the virtual participants. Alternatively, one can upload these results to the cloud after the fact into each players account so that they can see all of their historical games. But again, only *the players* can see this. If you did not participate you cannot see this information. These results are posted to the locations local 'leaderboards' for viewing in the lobby. These leaderboards are specific to each location and show daily, rolling 30 day and yearly rankings of the players who have played at that location. While no attempt is made to create a global leaderboard that ranks players from one location (say Seattle) against players from another location (say New York), it is within the scope of the invention to provide for such global information in the event that a game becomes an international or global activity.

It is a further aspect of a preferred embodiment of the invention to solve the issue of crowd control. In a typical situation, the number of players may be too many for a physical space. Similarly, the number of avatars in a room may too large to be handled and displayed. The maximum number of avatars, N, is determined by the game server and associated processor, but might also be determined for each activity or game. Game server comprises generally a network layer, protocol objects, user objects and room objects. In an object oriented software embodiment of the invention, each of these objects and layers are implemented as objects with their specific methods, data structures and interfaces. Where game server is implemented on a hardware running the game operating system, these objects might be objects in a single process or multiple processes.

The game server can be implemented to have multiple layer imbedded user objects that tracks the location of its user's avatar, which includes at least the room in which the user is located, the user's coordinates in the room and the user's orientation in that room. User object also maintains a list of the N nearest neighboring remote avatars (i.e., avatars other than the avatar for the user object's client/user) in the room.

One or more room objects is instantiated for each room in rooms database and the instantiation is done when server is initialized. Alternatively, room objects can be instantiated as they are needed. As explained above, the term "room" is not limited to a visualization of a typical room, but covers any region of the virtual world which could be grouped together, such as the underwater portion of a lake, a valley, or a collection of streets, depending on the game played and the physical facility being replicated. The room object for a specific room maintains a list of the users currently located in that room. Room object periodically analyzes the positions of all users in the room using a cell-based algorithm, and sends a message to each user object corresponding to those users in the room, where the message notifies the user object of its user's N nearest neighbors.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims. Furthermore, as used herein the terms game or games are able to refer to physical, virtual, mixed media or any other type of game including game objects.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of a special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein. It will further be understood that the processors and databases that are contemplated by the GameServer system are illustrative and that other processors may be employed to accomplish the same or substantially equivalent aspects of the invention.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like. Regardless of the type of computer program or computer involved, a computer program can be loaded onto a computer to produce a particular machine that can perform any and all of the depicted functions. This particular machine provides a means for carrying out any and all of the depicted functions which included the aggregation functions, the plotting and graphical functions, the virtual reality and mixed reality functions and such other aspects and functions as may be reasonably required to permit the invention to be practiced.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. It is possible to modify or customize general-purpose systems to be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware specialized through computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

Unless clearly claimed in the context, the words "embrace", "include" and the like should be interpreted as the meaning of containing rather than the meaning of exclusion or exhaustion; that is to say, the meaning of "include but not limited to".

In the description of the invention, the terms such as "the first", "the second" and the like are only used for the purpose of description, but cannot be interpreted as indicating or suggesting relative importance. In addition, in the description of the invention, unless otherwise stated, the meaning of "a plurality of" is two or more than two.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for creation, presentation and interaction within multiple reality and virtual reality environments, the method comprising:

creating a physical environment within a space;

placing a plurality of physical objects within the physical environment;

creating a virtual environment in a system server based on the physical environment and the plurality of physical objects, wherein the virtual environment reflects the physical environment's appearance and shows locations and shapes of the plurality of physical objects within the physical environment;

providing online players with access to the virtual environment via computing devices, where online players can navigate themselves and perform designated actions within the virtual environment through the computing devices;

detecting and sensing locations and movements of players within the physical environment through a plurality of sensors;

transmitting locations and movements of players within the physical environment to the system server, and displaying their locations and movements in the virtual environment through avatars;

equipping each of the players within the physical environment with an enhanced reality device, a transmitter and a receiver, where the enhanced reality device, the transmitter and the receiver are connected to the system server;

wherein the enhanced reality device shows at least locations and movements of the online players and their designated actions;

wherein the transmitter and the receiver enable players within the physical environment to interact with the online players and vice versa; and recording interactions among online players and players within the physical environment.

2. The method of claim 1, wherein the plurality of physical objects are obstacles and barriers.

3. The method of claim 1, wherein the computing devices comprise mobile devices, computers, gaming consoles and enhanced reality device.

4. The method of claim 1, wherein the enhanced reality device is a virtual reality (VR) headset or an augmented reality (AR) headset.

5. The method of claim 1, wherein the transmitter generates specified signal or pulse or sense specified actions and the receiver receives the specified signal or detects the specified actions.

6. The method of claim 1, wherein the system server makes movement assumptions to players within physical environment based upon their movement and speed, and the movement assumptions are incorporated to the avatars in the virtual environment.

7. The method of claim 6, wherein the movement assumptions comprises crouching, running, jumping and hand placement.

8. The method of claim 1, wherein the transmitter creates simulated actions and the receiver receives or detects the simulated actions, and the transmitter or the receiver is further attached to a processor which determines whether a particular simulated action is received from or responded by another player and notifies the system server.

9. A system for creation, presentation and interaction within multiple reality and virtual reality environments, the system comprising:
 a system server that provides online players with access to a virtual environment, wherein the virtual environment is created based on a physical environment's appearance and physical objects locating within the physical environment;
 wherein the online players access the virtual environment by connecting their computing devices to the system server, where online players navigate themselves and perform designated actions within the virtual environment using the computing devices;
 a plurality of sensors that are connected to the system server, the plurality of sensors detect and sense locations and movements of players within the physical environment;
 wherein the plurality of sensors transmit locations and movements of players within the physical environment to the system server, and the system server displays their locations and movements in the virtual environment as avatars so that online players would see locations and movements of players within the physical environment through online players' computing devices;
 a plurality sets of enhanced reality device, transmitter and receiver that are connected to the system server, where each set of enhanced reality device, transmitter and receiver is equipped by each of the players within the physical environment;
 wherein the enhanced reality device shows at least locations and movements of the online players and their designated actions;
 wherein the transmitter and the receiver enable players within the physical environment to interact with the online players and vice versa; and
 wherein interactions among online players and players within the physical environment are recorded by the system server.

10. The system of claim 9, wherein the computing devices comprise mobile devices, computers, gaming consoles and enhanced reality device.

11. The system of claim 9, wherein the system server is connected to a real-time display which shows the virtual environment, and actions and movements performed by online players and players in physical environment are reflected by avatars representing the players in the virtual environment.

12. The system of claim 9, wherein the transmitter generates signals containing unique identifier that identifies player who sends out the signals and the receiver is configured to receive signals transmitted by other transmitters.

13. The system of claim 9, wherein the transmitter creates simulated actions and the receiver receives simulated actions.

14. The system of claim 13, wherein the transmitter or the receiver is further attached to a processor which determines whether a particular simulated action is received from or responded to another player and notifies the system server.

15. The system of claim 9, wherein the system server makes movement assumptions to players within physical environment based upon their movement and speed, and the movement assumptions are incorporated to the avatars in the virtual environment.

16. A method for creation, presentation and interaction within multiple reality and virtual reality environments, the method comprising:
 creating a first physical environment at a first location;
 placing a plurality of physical objects within the first physical environment;
 creating a second physical environment at a second location that mimics the first physical environment including the plurality of physical objects in the first physical environment;
 creating a virtual environment in a system server based on the first physical environment and the plurality of physical objects, wherein the virtual environment mimics the first physical environment's appearance and shows locations and shapes of the plurality of physical objects within the first physical environment;
 providing online players with access to the virtual environment via computing devices, where online players navigate themselves and perform designated actions within the virtual environment through the computing devices;
 detecting and sensing locations and movements of players within the first physical environment and players within the second physical environment through a plurality of sensors;
 transmitting locations and movements of players within the first physical environment and players within the second physical environment to the system server, and displaying their locations and movements in the virtual environment using avatars;

equipping each of the players within the first physical environment and players within the second physical environment an enhanced reality device, a transmitter and a receiver;

wherein the enhanced reality device shows at least locations and movements of the online players and players from different physical environment and their designated actions;

wherein the transmitter creates simulated actions;

wherein the receiver detects simulated actions; and recording how many simulated actions were created and detected for each of the online players and players within the first physical environment and players within the second environment.

17. The method of claim 16, wherein the transmitter or the receiver is further attached to a processor which determines whether a particular simulated action is received from or responded to another player and notifies the system server.

18. The method of claim 16, wherein the computing devices comprise mobile devices, computers, gaming consoles and enhanced reality device.

19. The method of claim 16, wherein the plurality of sensors are part of an indoor positioning system.

20. The method of claim 16, wherein the system server makes movement assumptions to players within physical environment based upon their movement and speed, and the movement assumptions are incorporated to the avatars in the virtual environment.

* * * * *